Feb. 25, 1930.  W. K. KISE  1,748,135
COFFEE DRIPPER
Filed May 17, 1929
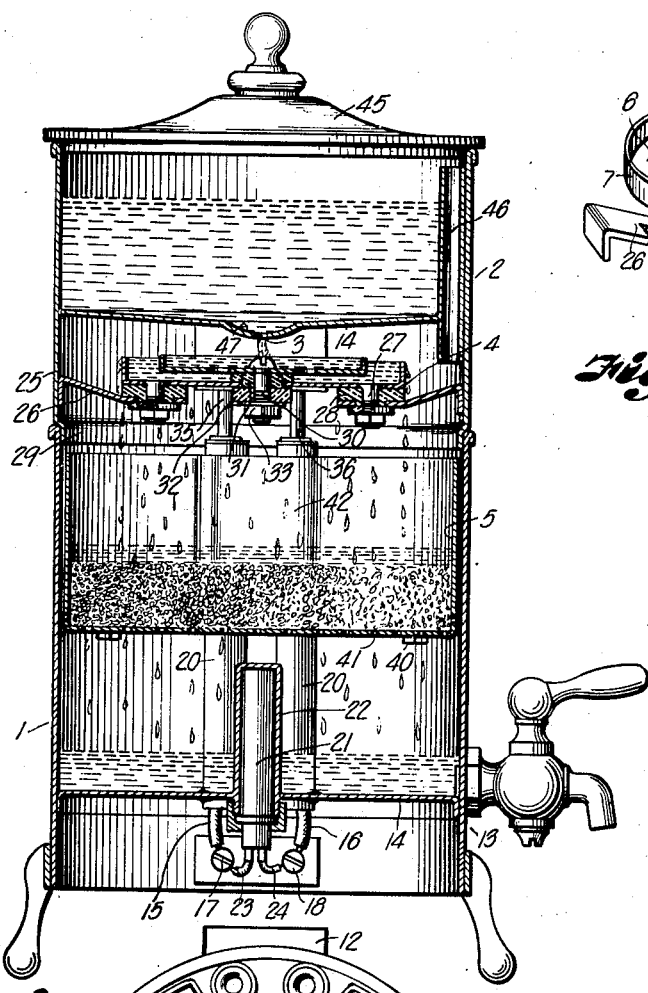
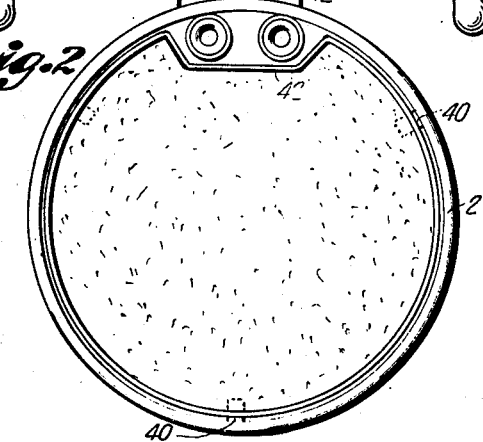
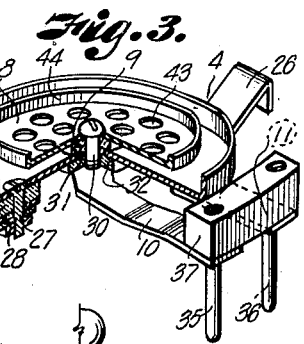
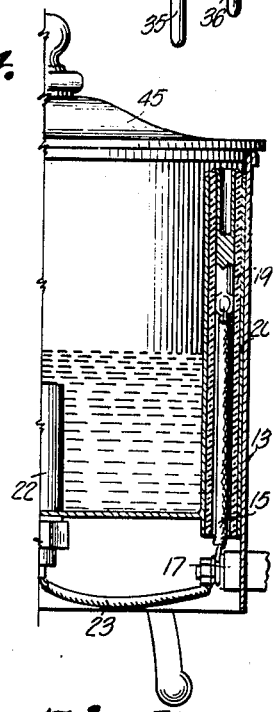
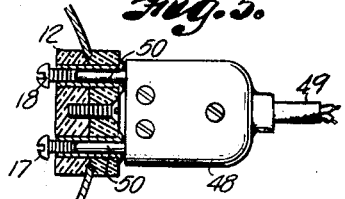
INVENTOR
William Kent Kise
BY
ATTORNEY Patented Feb. 25, 1930

1,748,135

UNITED STATES PATENT OFFICE

WILLIAM KENT KISE, OF KANSAS CITY, MISSOURI

COFFEE DRIPPER

Application filed May 17, 1929. Serial No. 363,781.

My invention relates to apparatus for brewing beverages and more particularly to coffee drippers, and has for its principal objects to isolate coffee extract from coffee grounds, to limit the extent of contact of hot water with coffee grounds, to include in coffee making apparatus means for maintaining the coffee solution in heated condition, and to automatically limit the heating effects of both the coffee-brewing and solution-heating elements of a device of this character, whereby the temperature of water that comes in contact with the coffee may be controlled, and the isolated coffee solution may be kept hot without overheating.

In the use of most ordinary apparatus for making coffee, relatively little control is afforded over the extent to which the water, the water-containing coffee grounds, or the juice, is heated, and repeated heating and boiling results in extraction of objectionable constituents of the ground coffee. It has generally been agreed that the best coffee is made by the use of water at a temperature below the boiling point, and approximately 190 degrees.

The boiling of coffee grounds, and the passing of boiling water through ground coffee, tend to extract the bitter elements. The passing of heated water, below the boiling point, through coffee grounds tends to extract only the pleasant aromatic oils and desirable constituents from the ground coffee.

In the ordinary percolator, however, the extract is boiled, by being brought into contact with the heating element; is delivered over the ground coffee, and is again returned to the heating element to be re-boiled. The boiling of the extract, and the repetition of the boiling by ordinary percolators, produce the same undesirable results as are produced by boiling the ground coffee, namely, the extraction of bitter, unwholesome elements. Furthermore, in addition to the extraction of bitter elements by boiling the grounds or the extract or both, there is an evaporation of the desirable aromatic and other oils, dissipation of which deprives the extract of its pleasant flavor, fragrance and other qualities, Further objects of my invention therefore are to heat measured quantities of water in successive portions or in a stream, pass the water at a temperature below the boiling point through a body of ground coffee, and isolate the solution formed by the passage of water through the ground coffee, so that only pure heated water is passed through the coffee for delivering solution to the previously deposited solution.

A further object of my invention is to purify water in the process of brewing a beverage.

In accomplishing these and other objects of the invention, I have provided improved details of structure, the preferred forms of which are illustrated in the accompanying drawings, wherein:

Fig. 1 is a central section through coffee making apparatus constructed in accordance with my invention.

Fig. 2 is a plan view of a cup and coffee reservoir.

Fig. 3 is a perspective view of a water heater partly broken away to illustrate insulators and connectors.

Fig. 4 is a fragmentary section of the device illustrating the mounting of conductors therein, and showing a lid mounted on the reservoir after removal of the water container.

Fig. 5 is an enlarged view partly in section of socket and plug members for delivering electric current to the device, and adjacent portions of the reservoir member in which they are mounted.

Referring in detail to the drawings:

The invention consists in general in a shell or vessel 1 comprising a reservoir to contain a solution or extract, and from which the solution may be delivered for use, a liquid container 2 having a small central orifice 3, a water heater 4 in receiving relation with the liquid container, and a support for ground coffee or the like comprising a perforate tray or brewing basket 5 similar to a filter cup located between the heater and the reservoir, whereby water may pass by gravity at a slow rate over the heater and through coffee grounds in the basket and pass out of the basket to the reservoir at a slower rate than from the container.

The water heater is constructed similarly to a water rheostat and includes a trough or pan-like base or tray 6 having an edge wall or flange 7 of relatively small depth, a plate 8 supported by an insulating washer 9 in spaced relation with the bottom and flange of the pan, and conducting straps 10 and 11 connected respectively with the pan and the plate and with an electrical circuit through a socket member 12 as later described.

Water rising in the pan into contact with the plate will close the circuit and become heated by the current passing therethrough, and the heated water will flow from the pan to the basket.

Conductors may be mounted in any suitable manner for connection with the pan and plate, but I prefer to mount the socket member in a downwardly extended base portion 13 of the reservoir shell below the bottom plate 14 and to lead conductors 15 and 16 from screw contacts 17 and 18 in the socket member toward the heater through insulating sleeves or conduits 19 extending in tubes 20 fixed to the reservoir wall and having lower ends extending through the bottom of the reservoir and sealingly attached thereto.

I prefer to extend the conductors alongside the reservoir wall, and within and through the reservoir in order to conceal the same, and also in order to facilitate provision of means for heating the solution in the reservoir.

The solution-heating means may comprise a resistance heater 21 located in heating relation with the reservoir, for example extending in the reservoir to comprise an immersion heater and preferably in a tubular projection 22 rising from the bottom plate of the reservoir. The solution heater is connected by wires 23 and 24 to the socket contacts 17 and 18.

The water container is provided with a downwardly extending flange portion or skirt 25, and the water heater is preferably supported by the container in the recess formed by the skirt. Spider-like arms 26 having flanges attached to the skirt, for example fixed thereto by welding, are attached by rivet-like bolts 27 to the pan and insulated therefrom by washers 28, the heads of the bolts being countersunk in the pan bottom. The lower edge portion of the container is preferably inwardly offset to provide an annular flange 29 adapted to fit closely in the reservoir and form a shoulder for supporting the container on the upper edge of the reservoir.

The connecting strap 10 extends beneath the pan and its inner end is attached to a conducting pin or bolt 30 mounted in a bushing 31 which may comprise a portion of the washer 9, in a central opening of the pan, the head of the bolt conductively engaging the plate 8. A washer 32 on the lower end of the bolt insulates the nut 33 thereon from the pan.

The connecting strap 11 is attached to the bottom face of the pan at 34. The outer ends of the straps 10 and 11 are fixed to contact posts 35 and 36 mounted in an insulating block 37 adapted to be attached to the water container in the illustrated method of supporting the heater, whereby the heater and the posts may be relatively rigidly mounted on the container. The block 37 may have screw threaded openings 38 to receive screws extending through the bottom of the water container for securing the block to the container.

The heater contact posts and block thus comprise a unit adapted to be removably mounted between the water container and the basket containing the coffee grounds.

The conductors 15 and 16 connected with the socket member are preferably provided with socket portions at their upper ends 39 fixed in the insulating sleeves 19, thus being in fixed relation with the reservoir to receive the contact posts 35 and 36.

The brewing basket is supported by the wall of the reservoir, for example by lugs 40 attached to the wall, and is provided with perforations 41 having total area so related to the area of the port in the water container that water will pass at a relatively slow rate through the basket and assure constant saturation of the coffee grounds while water is dripping from the heater.

The result desired may be obtained by providing perforations having greater total area than said port, but limited to control the flow sufficiently to permit water to rise in the basket. Water will, therefore, seep through the coffee slowly enough to extract desired constituents from the ground coffee. The basket is adapted to afford a space between the basket and the wall of the reservoir for the tubes 20, for example the vertical wall of the basket may have an offset portion 42 forming a recess or groove in which the tubes 20 are located when the device is assembled.

In order to assure heating of all water that passes from the container, the water heater plate may be provided with a plurality of openings 43, the openings adjacent the area of the plate which receives water from the container being especially significant, and when the heater is circular as shown, the plate comprises a disk and may be provided with an upstanding peripheral flange or rim 44 which is relatively low but adapted to project slightly above the level of the rim of the pan.

The container port is so located that water received by the heater will pass over substantially the whole area thereof and from an edge of the pan to the basket. I prefer to from the stream of water moving toward the grounds.

Foreign matter is precipitated by the current in the water heater, and foreign material flowing with the water to the basket is filtered out by the coffee grounds, and retained thereby.

The size of the container orifice may be adjusted to the size of the heater or other factors to assure adequate heating of the water and to provide for flow of the dripping particles of water at a desired rate. The spacing of the pan-like disk member, both from the bottom and the annular flange of the heater pan, and the delivery of the water to the center of the perforate disk, assure heating of all water before passing toward the basket to a predetermined and desired high temperature, for example the boiling point.

It is apparent, therefore, that any desired amount of a beverage proportionate to the amount of material that can be held by the basket, may be made by this device since one or more cups of water may be initially provided in the container, the heater functioning on even the smallest quantity of water to raise its temperature sufficiently to extract oils and flavors from the material in the basket, and to provide a beverage in hot condition. Attention is called to the fact that the coffee is not boiled.

When the predetermined amount of beverage has been brewed the circuit through the water heater is broken automatically by evaporation of the water in the heater pan and no more current is used in the water heater, and no danger of burning out or similar damage to the water heating apparatus is involved.

The solution deposited in the reservoir from the basket may be kept hot by the solution heater energized by the same circuit that energizes the water heater. While any well known means for employing currents of electricity to heat water may be used, I prefer to mount the relatively small heater illustrated in the bottom of the reservoir which will be energized so long as the plug is mounted in the socket, but will use a relatively small amount of electricity and will keep the solution hot indefinitely, or heat the same, without causing it to boil.

It is apparent that the device may be employed for supplying measured quantities of heated liquid at a measured rate to a reservoir, and is particularly useful for any process in which hot and especially purified water is to be passed through a material for producing a solution.

Attention is recalled to the heater, which is adapted to heat water to a temperature preferably at the boiling point for flow to the reservoir for brewing beverages, but which may be adapted, by greater spacing of the plates, for example, for heating liquids to lower or higher temperatures. The heater is spaced from the basket, for the brewing purposes described, sufficiently to permit the boiling water to cool to approximately 190 degrees before reaching the material in the basket, and this spacing may be adjusted as described for other purposes.

When the material to be brewed is coffee, the grounds provided may be divided by cutting or grinding, to a desired degree of fineness. When a basket is adapted initially to contain pulverized coffee grounds which will sufficiently retard flow of water to cause the water level to rise in the brewing basket above the grounds and submerge the same, a substantially equal amount of steel cut coffee may be supplied instead of pulverized coffee, and will retard the flow of water sufficiently to effect submergence of the coffee and brewing of the same.

What I claim and desire to secure by Letters Patent is:

1. In a device of the character described, including a reservoir and a water container supported by the reservoir and having an outlet port to the reservoir, and an electrical circuit, a heater supported by the container in receiving relation with the container and delivering relation with the reservoir, comprising a pan connected to the circuit and a perforate plate above the pan below the outlet port of the container and insulated therefrom and connected to the circuit.

2. In a device of the character described, including a reservoir and a water container supported by the reservoir and having an outlet port to the reservoir, and an electrical circuit, a heater supported by the cotnainer in receiving relation with the container and delivering relation with the reservoir, comprising a pan having an edge flange and connected to the circuit, and a plate above the pan below the outlet port of the container and insulated therefrom and connected to the circuit.

3. In a device of the character described including a reservoir, a liquid container, a basket adapted to be mounted on the reservoir below the container to receive liquid therefrom and deliver the liquid to the reservoir, and an electrical circuit, a liquid heater mounted between the container and the basket and connected with said circuit for heating liquid passing from the container to the reservoir through the basket, and a heater extending in the reservoir and connected with said circuit for heating liquid in the reservoir.

4. In a device of the character described including a reservoir, a liquid container, and a basket adapted to be mounted on the reservoir below the container to receive liquid therefrom and deliver the liquid to the reservoir, an electrical circuit adapted to be closed by liquid passing from the container for heating liquid passing from the container to form the heater circularly as stated, and to deliver water from the container to the axis of the disk-like perforate rimmed plate. Water from the container passing from the center of the dish-like disk towards its periphery will pass through the openings into the space between the disk and the bottom of the pan. The plate is spaced relatively slightly from the pan, thus affording a relatively short path for movement of electricity through the water.

A rim 44 is preferably provided on the disk to control the water that falls thereon and enforce its flow through the openings.

The plate and pan bottom are preferably equally spaced throughout the area of the plate, but may be positioned in any desired relation to horizontal, for example, being angular to a horizontal for gravity flow of liquid from the point at which liquid is received by the heater to the portion of the heater from which heated water is delivered to the basket.

A body of water is thus always present in the space between the disk and the pan to close the circuit when water is dripping from the container, and substantially all the water is subjected to the action of the current, to be heated, electrified, and purified.

The water container is mounted on the reservoir in substantially sealing relation therewith to check escape of vapors from the body of solution that collects in the reservoir, and thus tends to retain the aromatic oils and flavors of the coffee, and a lid 45 is adapted to cover the container. The vapors will exert appreciable pressure, and bear against the stream of water at the port of the container to retard the flow, and might escape between the container and the reservoir.

In order to avoid possible retardation of flow of water, and prevent escape of vapors, and to collect the vapors that otherwise might escape, I provide a relief conduit 46 comprising a tube communicating with the reservoir and extending through the bottom of the container and upwardly in the container to a point adjacent the top edge thereof, the tube projecting slightly below the bottom of the container and toward the reservoir.

Vapors rising in the reservoir and basket, and from the heater, may therefore pass into the water container, and be discharged into the space above the water level.

The vapors in the container will exert appreciable pressure, and tend to urge the water through the port. The vapor pressure effect will increase as the amount of solution in the reservoir increases and the amount of water in the container decreases, so that as the diminishing mass of water tends to flow by gravity more slowly, the vapor pressure will act increasingly to maintain the flow of water at a steady rate.

The vapors are preferably discharged into the container towards and against the lid, where portions may be condensed to fall to the body of water.

The vapors that contact the water and are thereby condensed, and the vapors that are condensed on the lid, are thus absorbed by the water, the aromatic oils and flavors being thus restored to the coffee, and tend to preheat the water.

A sump 47 may be formed in the bottom of the container to collect water, the port being located in the bottom of the sump.

A plug 48 provided with circuit wires 49 and contact posts 50 insertable in the socket member 12 may be removably attached to the socket for supplying current to the device.

The reservoir and water container are preferably constructed with non-conductive walls of glass, porcelain, china or the like; and may be wholly made of such material, to prevent conduction of current from the water heater to exposed surfaces.

In using apparatus constructed as described for brewing a beverage, a substance such as ground coffee, tea or the like is installed in the brewing basket, and the basket mounted on the lugs in the reservoir with its upper edge in spaced relation with the upper edge of the reservoir.

The water heater is then mounted above the basket and when supported by a water container, the container itself is mounted on the reservoir, the contact posts of the heater being inserted in the sockets on the ends of the conductors extending upwardly in the reservoir.

The plug is mounted in the socket member to condition the water heater for operation.

Sufficient water is then supplied to the container to make the desired number of cups of the beverage. The water passes at a predetermined rate through the outlet orifice of the container to the plate of the water heater, and from the plate to the pan.

When the water rises in the pan sufficiently to close the circuit through the heater circulation of the current not only heats the water but purifies the same. The heated water rising further flows over the edge of the pan flange and drips to the material in the basket.

Hot water collects in the basket submerging the grounds and saturating the same, and seeping therethrough to fall through the perforations in the bottom of the basket into the reservoir, thus effecting a brewing process.

Attention is called to the fact that current does not flow through the water heater until water accumulates sufficiently in the pan to close the circuit.

Water is quickly heated by the device, and immediately upon being heated is passed in relatively slow flow through the coffee or other material in the basket, and thus the extract or solution is isolated from the grounds and the reservoir through the basket, and a heater extending in the reservoir and connected with said circiut for heating liquid in the reservoir.

5. In a device of the character described including a reservoir, a liquid container mounted on the reservoir in substantially sealing relation therewith and having an outlet for gravity flow of liquid from the container to the reservoir, a cover on the container, and means for heating liquid delivered to the reservoir from the container, means including a tube extending in the container for passing vapors produced by heating the liquid to the container.

In testimony whereof I affix my signature.

WILLIAM KENT KISE.